United States Patent

Lu et al.

[11] Patent Number: 6,043,913
[45] Date of Patent: Mar. 28, 2000

[54] APPARATUS FOR PRODUCING DOT MATRIX HOLOGRAM

[75] Inventors: Ying-Tsung Lu, Hsinchu; Pai-Ping Huang, Hsinchu Hsien, both of Taiwan

[73] Assignee: Industrial Technology Research Institute, Hsinchu, Taiwan

[21] Appl. No.: 09/100,571

[22] Filed: Jun. 19, 1998

[51] Int. Cl.$^7$ .................................................... G03H 1/30
[52] U.S. Cl. ................................ 359/25; 359/20; 359/22; 359/35
[58] Field of Search ................................ 359/15, 20, 22, 359/25, 28, 31, 35, 567, 201, 209, 210

[56] References Cited

U.S. PATENT DOCUMENTS

| | | | |
|---|---|---|---|
| 5,291,317 | 3/1994 | Newswanger | 359/22 |
| 5,596,444 | 1/1997 | Eguchi | 359/210 |

FOREIGN PATENT DOCUMENTS 263565 of 1984 Taiwan.

Primary Examiner—Darren E. Schuberg
Attorney, Agent, or Firm—Harness, Dickey & Pierce, P.L.C.

[57] ABSTRACT

An apparatus for producing a dot matrix hologram is provided, which can fabricate a hologram of high quality, simplify the construction, and reduce the cost. This apparatus includes a laser source for providing a laser beam to form interference fringes, in which the laser beam is split and then overlapped to form interference fringes in a small region; an interference spot-adjusting system for adjusting the area of the small region by controlling the diameter of the cross section of the laser beam; an interference spot-revolving system for changing the direction of the interference fringes in the small region; a two-dimensionally movable platform, on which a recording substrate that is used to form a dot matrix hologram can be placed, for adjusting the position of the recording substrate; a shutter for controlling the exposure intensity by controlling the time that the laser beam passes through the shutter; a computer, for controlling the shutter to pass a laser beam of a predetermined intensity, and then controlling the interference spot-adjusting system to change the diameter of the cross section of the laser beam that is split and interfered in the interference spot-revolving system, to thereby form an interference spot on the recording substrate, thereafter sequentially forming other interference spots on different positions of the recording substrate by adjusting the direction of the interference fringe in the interference spot and moving the movable platform to accomplish the production of a dot matrix hologram for the predetermined image.

11 Claims, 4 Drawing Sheets

APPARATUS FOR PRODUCING DOT MATRIX HOLOGRAM

BACKGROUND OF THE INVENTION

1. Field of the Invention

The present invention relates to a system for producing a hologram, and more particularly to an apparatus for producing a dot matrix hologram, which can speed up the production rate and reduce the bulk of the production apparatus. Furthermore, the resolution can be adjusted as the dot matrix hologram is being produced.

2. Description of Prior Art

Refer to FIG. 1, the production of a conventional hologram, such as a rainbow hologram, normally comprises the steps of: emitting a laser beam 2a from a laser light source 2; splitting the laser beam 2a into two laser beams 5a and 5b by a beam splitter 5 after passing through a shutter 3 and a mirror 4, wherein the beam 5a functions as a reference beam that is projected on a recording substrate after passing through a mirror 6, a spatial filter 7 and a lens set 8, and the beam 5b illuminates the object 17 after passing through a beam splitter 11, mirrors 12, 14, and spatial filters 13, 16, thus scattering onto the recording substrate 18; and exposing the recording substrate 18 by the interference fringes of the reference beam 5a and the object beam 5b. However, this conventional production method demands a high quality of laser beam, and is also costly and difficult to practice. Furthermore, the area required for constituting such a production apparatus is large since a large image area is required.

In the prior art, another type of hologram, a dot matrix hologram, has been provided. The fabrication of dot matrix hologram is similar to the printing process of a computer via a dot matrix printer, which prints an image outputted from the computer onto a document dot-by-dot. An apparatus for producing a dot matrix hologram functions as a dot matrix printer, converting an image, such as a fish's image, into a dot matrix of pixels via a computer, and exposing a recording substrate by means of the apparatus corresponding to the dot matrix of pixels, so as to transfer plural tiny areas of grating 20 to the substrate 22 and thus form a dot matrix hologram as shown in FIG. 2.

Since the apparatus for producing a dot matrix hologram is controlled by a computer, therefore it is easy to operate. Furthermore, since the exposure area is tiny, the exposure time can be reduced to a few microseconds; the optical system is thus less subject to vibration or interference from the surroundings. The stability of the apparatus for producing a dot matrix hologram is superior to the other conventional fabricating apparatus, thus reducing the cost.

A dot matrix hologram can present an image with a variety of bright and dazzling visual effects by changing the direction and density of the gratings formed in the plurality of tiny areas. The change of the grating's direction can provide an image with fluid and dynamic effects. The change of the grating's density can provide an image with colorful effect. The above two factors determine the effect of a hologram. However, the quality of image is determined by the resolution of a hologram. The lower the resolution of a hologram, the lower the density of pixels constituting an image. That is, the particles constituting an image are large, and thus the image is coarse.

A known method of fabricating dot matrix color hologram is disclosed by Taiwanese Patent No. 263565, which is a system for producing a digital color hologram. Referring to FIG. 3, in such a system, a laser beam 32a is generated by a laser light source 32. The laser beam 32a passes through a shutter controlled by a computer 31, then enters an interference system 35 including a beam splitter 38, and is split into two beams. The beam that maintains the original direction projects onto the recording substrate 39 after passing through the reflectors 38b, 40b and the triangular reflector 40c. The other beam 35a projects onto the recording substrate 39 after passing through the beam splitter 38a, the reflectors 38c, 38d, 40a and the triangular reflector 40c. The two beams having an identical optical path will interfere with each other. The interference fringes are then recorded on the recording substrate 39. The exposure time can be controlled by the shutter 33. The computer 31 can control the driver 50 to drive the revolving spindle 51 so as to rotate the interference system 40. The recording substrate 39 is placed on a turntable 36 and a 2-dimensionally-movable platform 37, Is so it can rotate and shift in a plane. In a system described above, a dot matrix color hologram can be obtained by forming gratings of different fringe densities. However, since the diameter of the spot of a laser beam is normally larger than 1 mm, i.e. 25.4 dpi, after being emitted from a laser cavity, and the conventional system can not reduce the diameter of the spot, therefore the particles of each pixel on the hologram look very clear. In other words, even though the image quality of the hologram is coarse, an excellent image is provided.

SUMMARY OF THE INVENTION

Accordingly, it is an object of the present invention to provide an apparatus for producing a dot matrix hologram in which the above-described problems are eliminated, so as to produce a hologram of high quality.

It is another object of the present invention to provide an apparatus for producing a dot matrix hologram that can simplify the construction and reduce the cost of the apparatus.

According to this invention, the apparatus for producing a dot matrix hologram utilizes a revolving system to rotate the direction of the interference fringe to speed up the processing rate. Furthermore, the apparatus for producing a dot matrix hologram utilizes a set of lenses to change the resolution of the hologram by altering the focus length of the lens set or the relative distance between the lens set and the recording substrate.

BRIEF DESCRIPTION OF THE DRAWINGS

The following detailed description, given by way of example and not intended to limit the invention solely to the embodiments described herein, will best be understood in conjunction with the accompanying drawings in which.

DETAILED DESCRIPTION OF THE PREFERRED EMBODIMENTS

Figure 1:
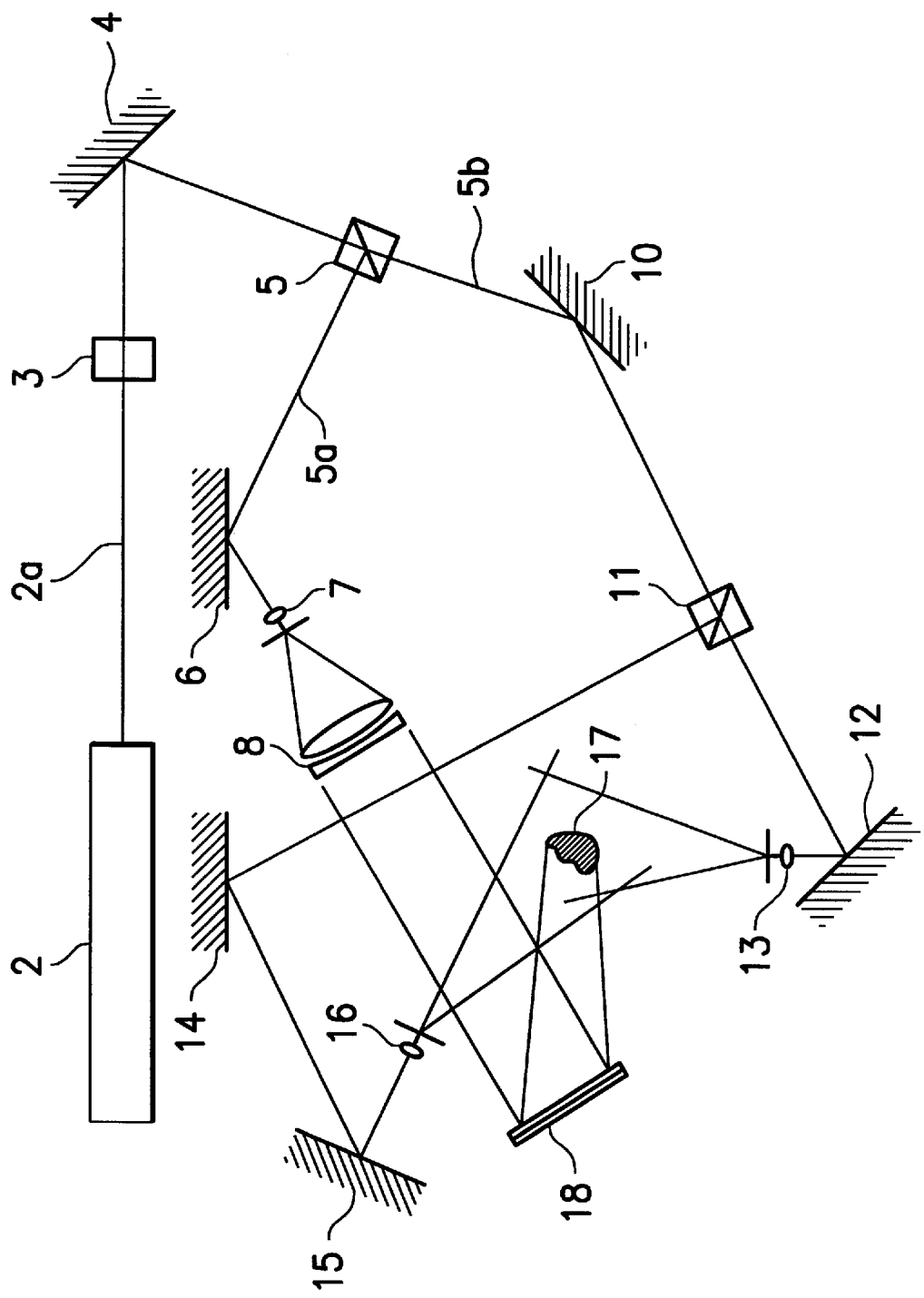
FIG. 1 is a diagram illustrating the structure of a conventional apparatus for producing a rainbow hologram.
Figure 2:
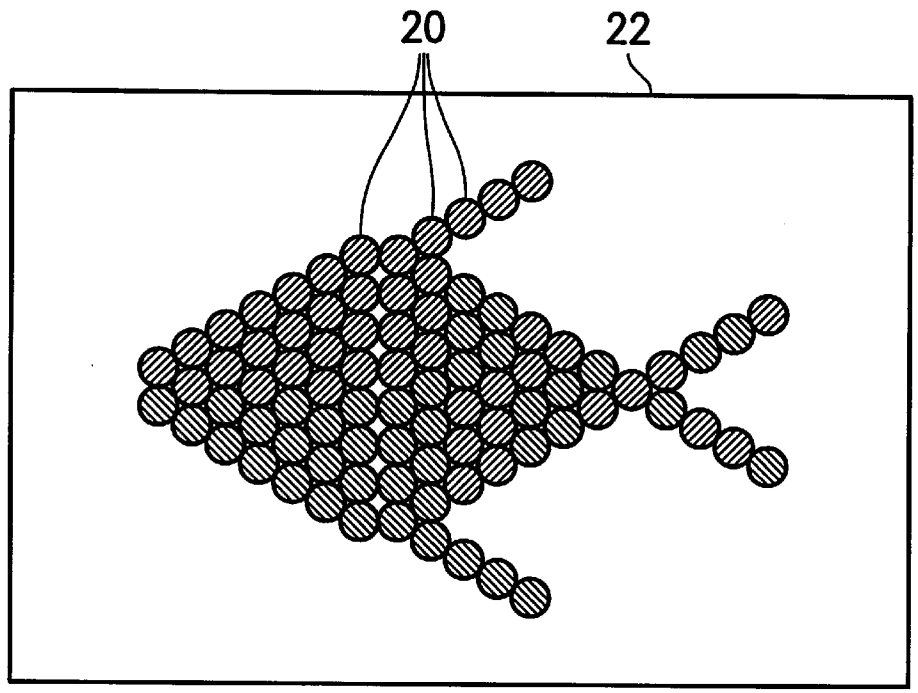
FIG. 2 illustrates a plane diagram of a dot matrix hologram.
Figure 3:
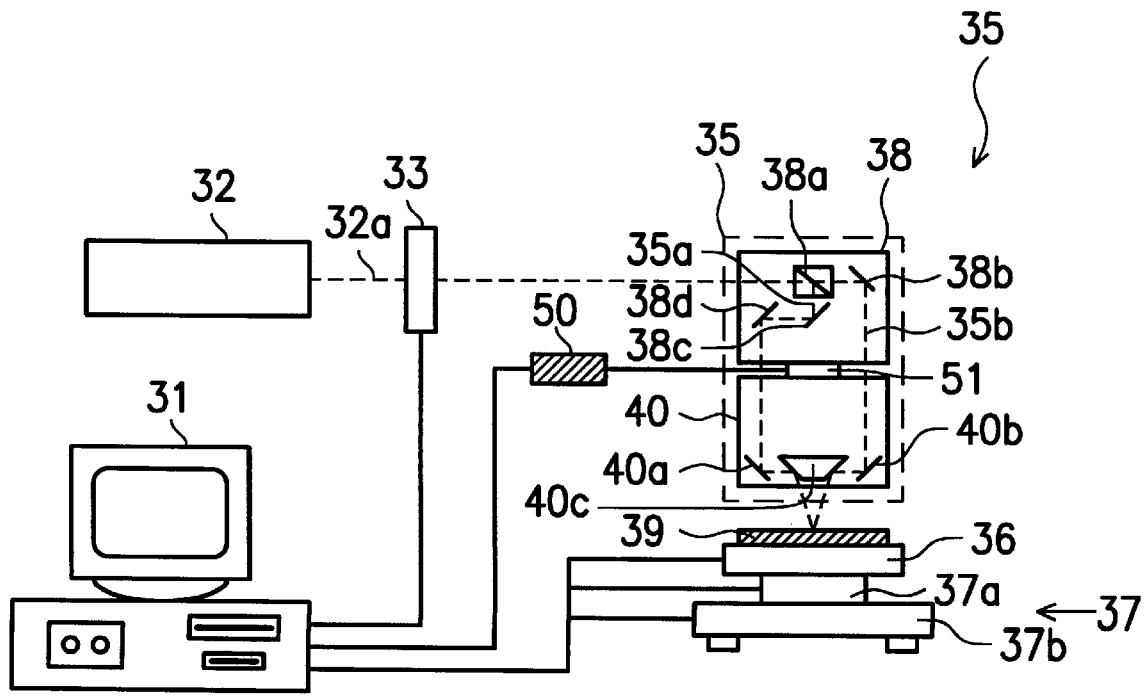
FIG. 3 is a diagram illustrating the structure of a conventional apparatus for producing a dot matrix hologram.
Figure 4:
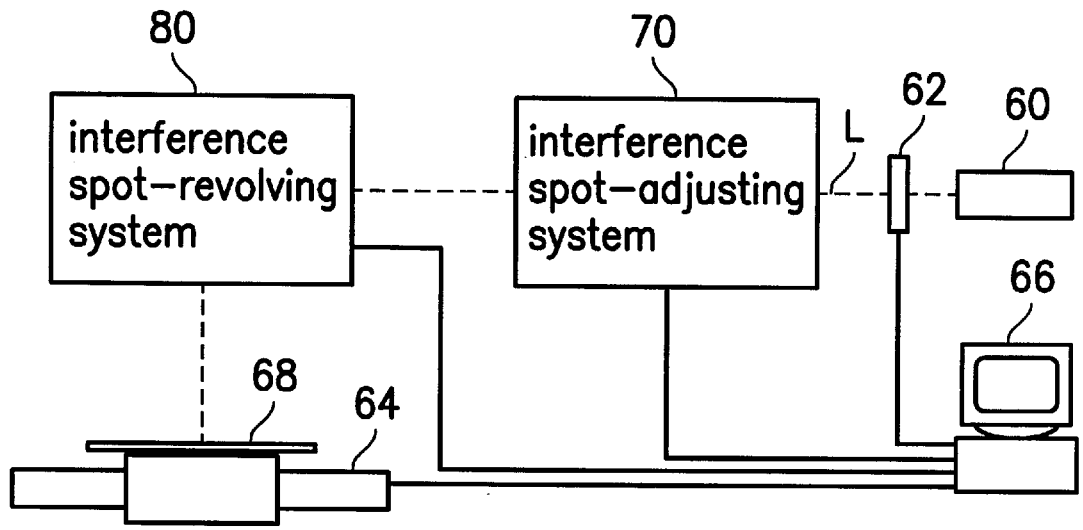
FIG. 4 is a diagram illustrating the structure of an apparatus for producing a dot matrix hologram according to the present invention.

Referring to FIG. 4, an apparatus for producing a dot matrix hologram according to the present invention comprises: a laser light source 60 providing the laser beam L for generating interference fringes in a spot; an interference spot-adjusting system 70 for controlling the diameter of a cross section of the laser beam L to adjust the size of the spot; an interference spot-revolving system 80 for changing the direction of the interference fringes in the spot; a 2-dimensionally movable platform 64 on which a recording substrate 68 used to form a dot matrix hologram can be placed and by which the position of the recording substrate 68 can be adjusted; a shutter 62 for controlling the exposure time of the recording substrate 68; and a computer 66, based on a previously designed image, for controlling the shutter 62 to pass a predetermined amount of laser beam through the shutter 62, and controlling the interference spot-adjusting system 70 to adjust the diameter of the cross section of the laser beam, which is split and interfered in the interference spot-revolving system 80 to form an interference spot on the recording substrate 68, then controlling the interference spot-revolving system 80 to change the direction of interference fringes in the interference spot and controlling the 2-dimensionally movable platform 64 to shift the recording substrate 68 to expose interference spots on different positions of the recording substrate 68 and form the previous designed image.

Figure 5:
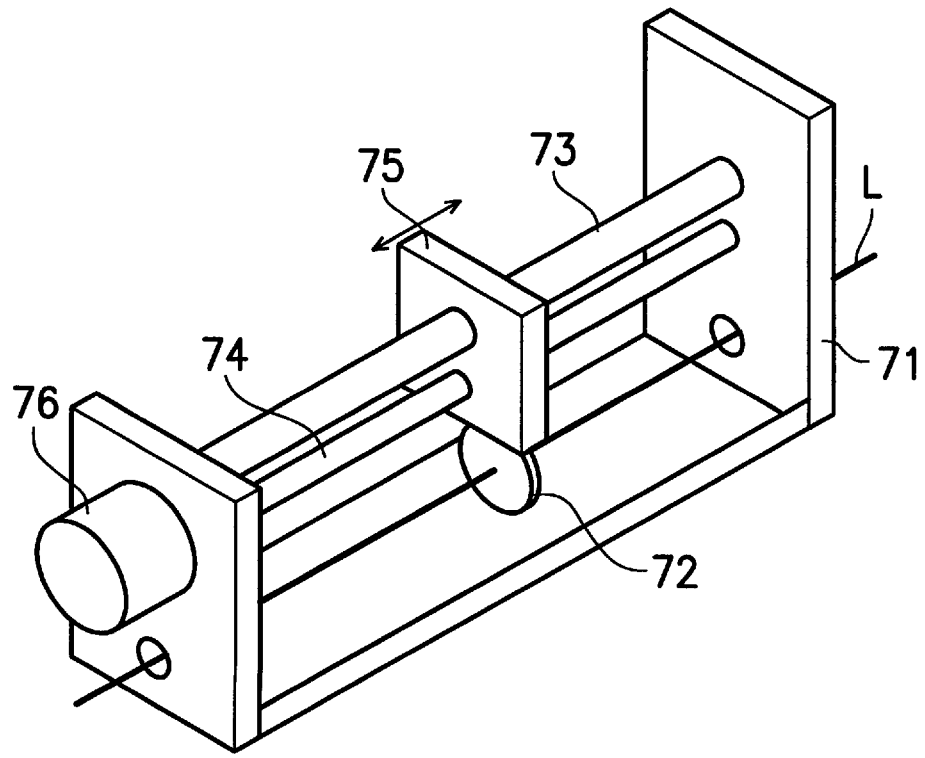
FIG. 5 is a diagram illustrating the structure of an interference spot-adjusting system in an apparatus for producing a dot matrix hologram according to the present invention.

Referring to FIG. 5, the interference spot-adjusting system 70 comprises: a supporter 71; a lens 72 collimating the laser beam L; a screw 73 that is parallel to the laser beam L and is installed on the supporter 71; a rail 74 that is parallel to the screw 73 and is installed on the supporter 71; a sliding bench 75, that is installed on the rail 74 and moves along the direction of the laser beam L with the rotation of the screw 73, for mounting the lens 72; and a motor for driving the rotation of the screw 73.

In order to reduce the aberration and improve the quality of the interference spot, the lens used in the interference spot-adjusting system 70 can be replaced by a set of lenses or a GRIN lens. For example, the set of lenses can be a zoom lens set.

Figure 6:
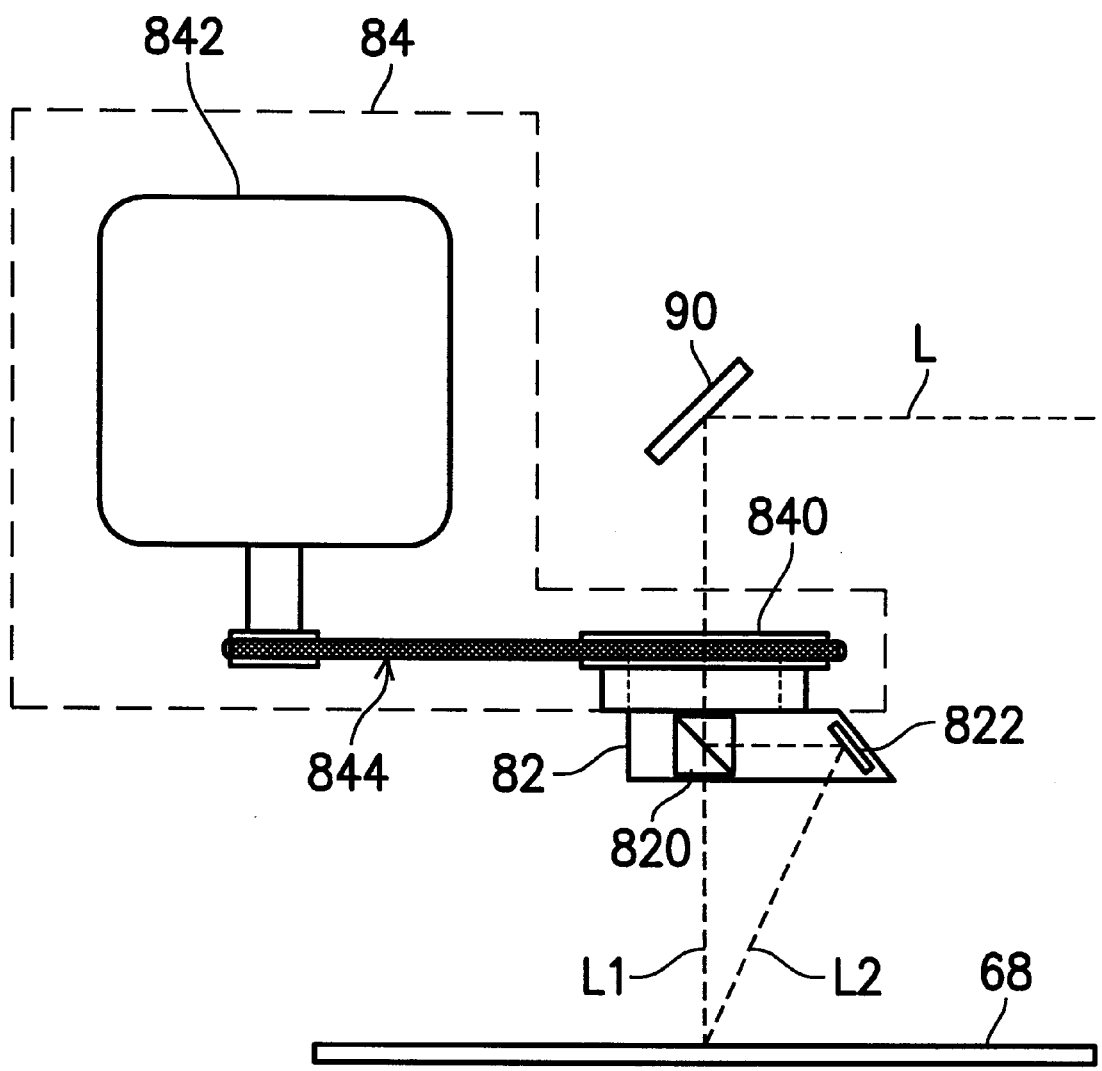
FIG. 6 is a diagram illustrating the structure of an interference spot-revolving system in an apparatus for producing a dot matrix hologram according to the present invention.

Referring to FIG. 6, the interference spot-revolving system 80 comprises: a beam splitting and interfering device 82, including a beam splitter 820 for splitting the laser beam L reflected by the mirror 90 into a first beam L1 and a second beam L2, in which the first beam L1 propagates along the original direction of the laser beam L and the second beam L2 is reflected by the beam splitter 820; a reflective mirror 822 for reflecting the second beam L2 to interfere with the first beam L1 and form interference spots on the recording substrate 68; a rotating device 84, including a turntable 840, for mounting and rotating the beam splitting and interfering device 82; and a motor 842 for rotating the turntable 840 via a belt 844, so that the beam splitting and interfering device 82 is rotated to change the direction of the interference fringes in the spots.

The process for producing a dot matrix hologram by means of the production apparatus of this invention comprises the steps of: (1) determining the resolution and dimension of a hologram to be made and storing the relevant data in bitmap format; (2) maintaining the overlap of two beams, which are interfered with each other, to ensure the interference spots produced by the two beams revolve at a certain position while the interference spot-revolving system 80 is rotating, thereby setting up the lookup table for the position and resolution of the lens or lens set; (3) turning on the production apparatus, so that the computer 66 performs a control program of said apparatus, selecting a desired resolution and retrieving data from the lookup table, driving the lens or lens set of the interference spot-adjusting system 70 to alter the size of the interference spot to a predetermined resolution, wherein a camera and a monitor are used to inspect the quality and the overlapping degree of the interference spot; (4) setting parameters of the production apparatus, such as the velocity of the movable platform 64, the exposure time of the shutter 62 and the direction of the grating, according to the data retrieved from the lookup table; (5) placing the recording substrate 68 on the movable platform 68, then starting to produce the dot matrix hologram as a master under the control of the computer 66; (6) developing the recording substrate 68 after exposure, then electroforming a nickel pattern plate on the master, whereby the nickel pattern plate can be used for the mass production of dot matrix holograms.

Compared with the Taiwanese Patent No. 263565, the production rate of this invention is two times of that of the prior art. Furthermore, the hologram's resolution of this invention can be as high as 400 dpi far superior to the 25 dpi of the prior art. In addition, the volume of the fabricating apparatus according to this invention is three-fifths that of the prior-art apparatus. Therefore, the cost of the production apparatus can be markedly reduced.

While the present invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives that have been discussed above and all equivalents thereto.

What is claimed is:

1. An apparatus for producing a dot matrix hologram, comprising:

a laser source for providing a laser beam to form interference fringes, the laser beam being split and then overlapped to form interference fringes in a small region;

a single lens for collimating the laser beam;

an interference spot-revolving system for changing the direction of the interference fringes in the small region;

an interference spot-adjusting system for adjusting the area of the small region by controlling the diameter of the cross section of the laser beam, the controlled diameter laser beam being input to the interference spot revolving system;

a two dimensionally movable platform for supporting a recording substrate that is used to form a dot matrix hologram, the movable platform adjusting the position of the recording substrate;

a shutter for controlling the exposure of the recording substrate to the laser by controlling the time that the laser beam passes through the shutter;

a computer for forming a predetermined image on the recording substrate, the computer controlling the shutter to pass the laser beam of a predetermined intensity, and then controlling the interference spot-adjusting system to change the diameter of the cross section of the laser beam that is split and interfered in the interference spot-revolving system, thereby forming an interference spot on the recording substrate, thereafter sequentially forming other interference spots on different positions of the recording substrate by adjusting the direction of the interference fringe in the interference spot and moving the movable platform to accomplish production of a dot matrix hologram for the predetermined image.

2. An apparatus for producing a dot matrix hologram as claimed in claim 1 wherein the interference spot-adjusting system includes:

a lens driving system for moving the lens forward and backward along the optical axis.

3. An apparatus for producing a dot matrix hologram as claimed in claim 1 wherein the beam splitting and interfering device includes:

a beam-splitting and interfering device for forming an interference spot from the laser beam; and a rotating device for driving the beam-splitting and interfering device to rotate the laser beam along an optical axis of the laser beam.

4. An apparatus for producing a dot matrix hologram as claimed in claim 2 wherein the lens driving system includes:

a supporter;

a screw that is parallel to the laser beam and installed on the supporter;

a rail that is parallel to the screw and installed on the supporter;

a sliding bench, installed on the rail and moving along the direction of the laser beam with the rotation of the screw, for mounting the lens; and a motor for driving the rotation of the screw.

5. An apparatus for producing a dot matrix hologram as claimed in claim 2 wherein a lens set is used instead of the lens.

6. An apparatus for producing a dot matrix hologram as claimed in claim 2 wherein the lens is a GRIN lens.

7. An apparatus for producing a dot matrix hologram as claimed in claim 3 wherein the beam-splitting and interfering device includes: a beam splitter for splitting a laser beam reflected by the mirror into a first beam and a second beam, in which the first beam propagates along the original direction of the laser beam and the second beam is reflected by the beam splitter; and a reflective mirror for reflecting the second beam to interfere with the first beam and forming interference spots on the recording substrate.

8. An apparatus for producing a dot matrix hologram as claimed in claim 3 wherein the rotating device includes: a turntable for mounting and rotating the beam splitting and interfering device; and a motor for rotating the turntable via a belt, so that the beam splitting and interfering device is rotated to change the direction of the interference fringes in the spots.

9. A method for producing a dot matrix hologram comprising the steps of:

(i) providing a laser beam and employing a shutter to control initiation and termination of the laser beam;

(ii) mounting a recording substrate on a two-dimensional movable platform;

(iii) passing the laser beam through an interference spot-adjusting system for adjusting a diameter of the laser beam, and passing the adjusted laser beam through an interference spot-revolving system to form an interference spot on a recording substrate;

(iv) employing a computer to control the shutter to adjust the exposure of the recording substrate for each interference spot, and controlling the interference spot-adjusting system to adjust the size of the interference spot;

(v) changing the direction of interference fringes in each interference spot by the interference spot-adjusting system, and moving the two-dimensional movable platform to perform the exposure of each interference spot at different positions of the recording substrate according to a pre-designed pattern.

10. A method for producing a dot matrix hologram as claimed in claim 9 wherein, in the step (iii), while the laser beam passing the interference spot-adjusting system, the size of the interference spot can be changed by adjusting the position of a lens in the interference spot-adjusting system to change the resolution of the dot matrix hologram.

11. A method for producing a dot matrix hologram as claimed in claim 9 wherein, in the step (v), the laser beam is split into a first beam and a second beam that are overlapped to form interference fringes in a spot, in which the direction of the interference fringes changes as soon as the interference spot-revolving system rotates.

* * * * *